United States Patent [19]
Kojima et al.

[11] Patent Number: 5,263,042
[45] Date of Patent: Nov. 16, 1993

[54] DIFFUSION REFLECTOR

[75] Inventors: Minoru Kojima, Sodegaura; Kazuyoshi Sutoh, Noda, both of Japan

[73] Assignees: Mitsui Petrochemical Industries, Ltd., Tokyo; Miyachi Technos Corporation, Noda, both of Japan

[21] Appl. No.: 730,464

[22] Filed: Jul. 16, 1991

[30] Foreign Application Priority Data

Jul. 16, 1990 [JP] Japan ................... 2-187619
Jul. 16, 1990 [JP] Japan ................... 2-187620

[51] Int. Cl.$^5$ ................................... H01S 3/093
[52] U.S. Cl. ................................ 372/72; 372/99; 372/69; 372/92
[58] Field of Search ............... 372/99, 72, 92, 69, 372/70

[56] References Cited

U.S. PATENT DOCUMENTS

| | | | |
|---|---|---|---|
| 3,555,449 | 1/1971 | Osial et al. | 372/72 |
| 3,634,777 | 1/1972 | Uchida et al. | 372/72 |
| 3,663,893 | 5/1972 | Ostermayer, Jr. | 372/72 |
| 3,668,546 | 6/1972 | Schumacher | 372/72 |
| 3,979,696 | 9/1976 | Buchman | 372/72 |
| 4,805,181 | 2/1989 | Gibson et al. | 372/72 |
| 4,858,243 | 8/1989 | Bar-Joseph | 372/72 |
| 4,912,720 | 3/1990 | Springsteen | 372/72 |

*Primary Examiner*—Léon Scott, Jr.
*Attorney, Agent, or Firm*—Sherman and Shalloway

[57] ABSTRACT

A diffusion reflector is formed of mica ceramics or fluorine plastics containing barium sulfate, on the surface of which gold or silver is vapor deposited to enhance a diffusion reflectance. A reflective cylinder is formed from said diffusion reflector, and laser rods and lamps are arranged in an internal space of the reflective cylinder to form a solid laser device. Thereby, light can be diffused without focussing light within the reflective cylinder, and the laser rods can be uniformly excited.

4 Claims, 7 Drawing Sheets

DIFFUSION REFLECTOR

BACKGROUND OF THE INVENTION

The present invention relates to a diffusion reflector, and particularly, to a diffusion reflector used for a reflective cylinder of apparatus in which a laser rod is excited by an lamp and the like, and a solid laser device utilizing the former.

Generally, in a solid laser device such as a YAG laser, a glass laser and the like, a flash lamp such as a xenon lamp provided within a reflective cylinder is illuminated and illuminant energy thereof is irradiated on the YAG rod or the glass rod to provide a laser oscillation.

The reflective cylinder is formed into an elliptical sectional shape, and is subjected to metal vapor deposition to form a mirror surface. The laser rod and the exciting lamp are located at the focal point of the ellipse. An exciting light caused by illumination of the exciting lamp is reflected on the inner surface of the reflective cylinder and then incident on the laser rod.

This construction will be specifically described with reference to FIG. 8.

As shown in the figure, a laser rod 12, and lamps 13 and 13 are arranged in parallel within a reflective cylinder 10.

The reflective cylinder 10 has a section formed into a double ellipse, and metal is vapor-deposited on the inner surface thereof.

When the lamps 13 are illuminated, a direct light 13a and a reflective light 13b arrive at the laser rod 12. Since the laser rod 12 and the exciting lamps 13 are arranged at the focal point of the ellipse, all the reflective light 13b are focused on a center portion of the laser rod 12.

However, in such a device as described, the center portion of the laser rod 12 is strongly excited but the outer peripheral portion thereof is not applied with sufficient excitation, resulting in unevenness of distribution of laser gain.

Figure 8:
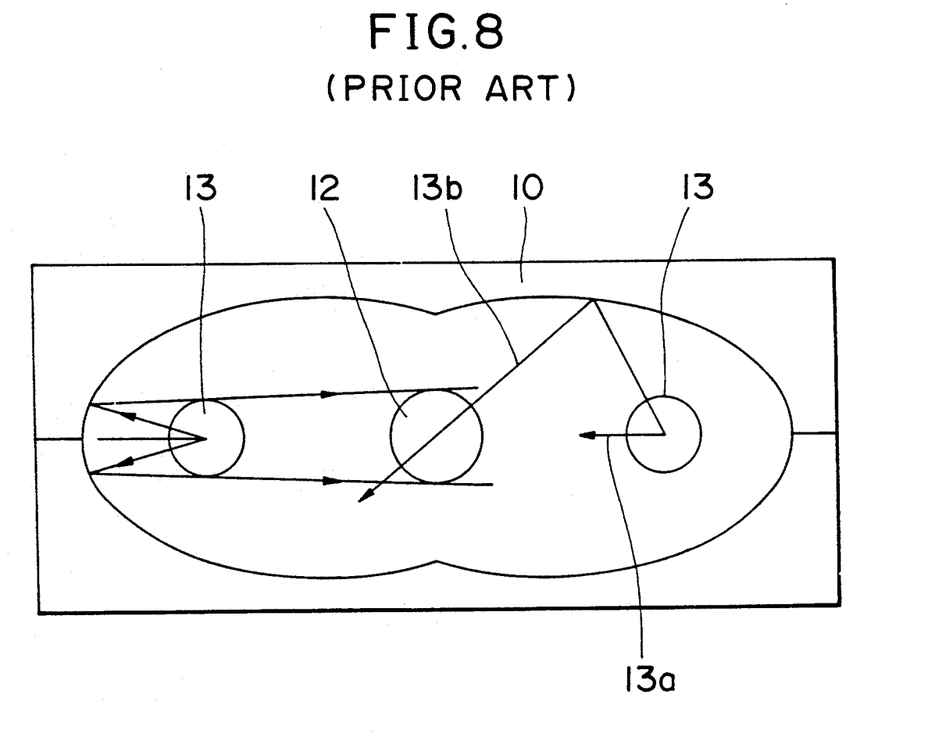

In a case where light from the lamps 13 is smaller than an angle indicated at $\theta$ in FIG. 8 and radiated in a direction opposite to the laser rod 12, the light is interrupted by the lamps 13 themselves, which poses a problem in that the light cannot arrive at the laser rod 12.

Figure 7:
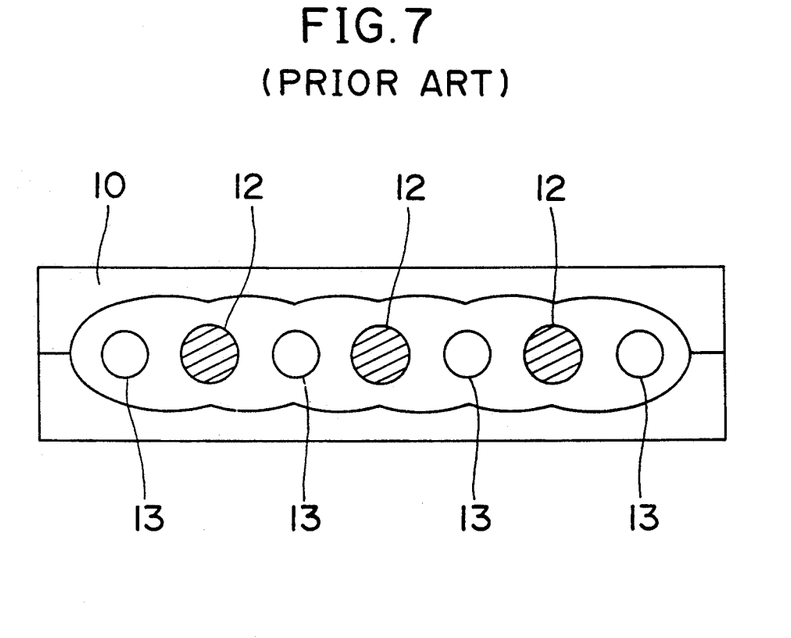
FIGS. 7 and 8 are respectively sectional views showing a conventional laser device.

Furthermore, the number of the lamps 13 increases such as a single ellipse in case where there is one lamp 13 and a double ellipse in case of two lamps 13. With this increase, the inner shape of the reflective cylinder 10 becomes complicated. In a case where four lamps 13 are used, as shown in FIG. 7, a complicated shape of a hexaellipse results. The reflective cylinder having a multi-elliptical construction as described above has a problem in that not only the manufacture is difficult but uniformity of reflective light is further broken to worsen the exciting efficiency.

The present invention has been achieved in view of the background as described above. The present invention has its technical task of obtaining a diffusion reflector which is equality in exciting and high in reflective efficiency in a reflective cylinder which constitutes a solid laser device.

SUMMARY OF THE INVENTION

For solving the aforementioned technical task, the present invention is characterized by a structure of a reflective cylinder and a diffusion reflector which has high diffusion reflective efficiency.

Specifically, a diffusion reflector of this first invention (claim 1-3) is a diffusion reflector characterized in that at least one of gold and silver is vapor-deposited on the reflective surface.

The diffusion reflection termed herein is that when a certain surface is viewed, light is reflected not only in a mirror surface reflective direction but in all directions.

Preferably, the diffusion reflector is formed of material whose diffusion reflectance is substantially 95% or more, preferably, near 100%. Here, substantially 95% or more of the diffusion reflectance does not mean that light of 95% or more is merely reflected on the incident light but means that while a light from a light source is repeatedly scattered in a closed reflective surface internally of an integrating sphere whose reflective surface is closed, energy to be detected is substantially 95% or more.

As such a diffusion reflector, there can be mentioned mica ceramics or fluorine plastics resin which contain, for example, 10 to 20 weight % of barium sulfate.

As the mica ceramics, free-cutting ceramics (for example, manufactured by MITSUI KOZAN K. K. under the trademark, "MACERITE") can be used. In this case, manufacture and working are easy.

It is noted that one having a diffusion reflectance substantially in excess of 95% with respect to light having a wavelength in the specific range is selected according to the kind of lasers. For example, for Nd: YAG laser, one having a diffusion reflectance substantially in excess of 95% over 500 to 1000 nm is selected.

The diffusion reflector according to the present invention can be suitably utilized for a solid laser device.

That is, there is provided a solid laser device in which a reflective cylinder is interiorly provided with laser rods and lamps, and light released from the exciting lamps are reflected on the inner surface of the reflective cylinder to condense the light on the laser rods.

The reflective cylinder is preferably formed from a diffusion reflector according to the present invention, especially a diffusion reflector which has high diffusion reflective efficiency. In this case, the section of the interior of the reflective cylinder is formed into a shape in which two semicircles are connected by a straight line, and the laser rods and lamps are alternately provided in plural rows within the reflective cylinder to constitute a solid laser device.

At least one of gold and silver is vapor deposited on the reflective surface of the diffusion reflector to improve the diffusion reflectance.

A reflective spectrum peculiar to metal is obtained according to the kind of metal subjected vapor deposition. It is possible to suppress reflection of light having a short wavelength which is unnecessary and causes to lower an oscillation efficiency with respect to excitation shorter than 500 nm for gold and shorter than 330 nm for silver, for example. Accordingly, which metal is subjected to vapor deposition is selected according to uses.

In the present invention, at least one selected out of gold and silver is vapor-deposited on the reflective surface of the diffusion reflector to obtain a diffusion reflector having a reflective characteristic peculiar to metal and improve the diffusion reflectance.

In the case where the present invention is applied to the solid laser device, it is desired that as the laser rod, when the diffusion reflectance is substantially 95% or more over infrared to near infrared region, the exciting efficiency is improved.

As laser mediums provided within the reflective cylinder, a YAG (Nd: YAG), a glass, ruby, alexandrite, titanium added sapphire and the like can be mentioned, and as lamps, a crypton type or a xenon type can be mentioned. Among of laser mediums mentioned above, Nd: YAG is preferable. As shape of laser medium, rod type is preferable.

A suitable clearance between the inner surface of the reflective cylinder and the laser rod is of the order of 5 mm to 15 mm, preferably, of the order of 10 mm.

DETAILED DESCRIPTION OF THE INVENTION

Embodiments of the present invention, comparative examples and applied examples will be described hereinafter with reference to the drawings.

Figure 3:
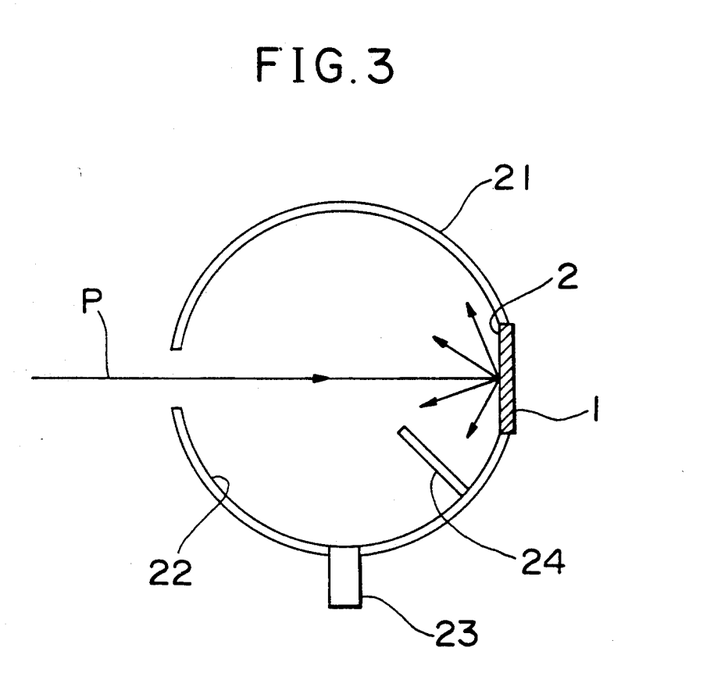
FIG. 3 is a schematic view of an experimental apparatus.

As shown in FIG. 3, in an embodiment of the present invention and a comparative example, a diffusion reflector 1 of the present invention as a specimen is mounted on an integrating sphere 21 having a reflective surface 22, a light P from a light source is irradiated on the specimen, and the light reflected within the sphere is measured by a photodetector 23 to calculate the diffusion reflectance.

The integrating sphere 21 is formed of publicly known barium sulfate or the like, and the reflective surface 22 thereof is coated with a publicly known diffusion paint, for example, a white paint having a large diffusion reflectance.

Reference numeral 24 designates a buffle plate for preventing light reflected at the specimen (diffusion reflector 1) from being directly incident on the detector 23.

First, a standard reflective plate for reference formed of barium sulfate or the like which is the same quality as that of the aforesaid integrating sphere is mounted in place of the aforesaid specimen (diffusion reflector 1). Assuming that the value of light at that time is 100%, and the diffusion reflectance of specimen (diffusion reflectance 1) is calculated with said value as a reference.

EMBODIMENT OF THE PRESENT INVENTION

The diffusion reflector 1 is formed from "MACERITE" (Trademark) manufactured by MITSUI KOZAN K.K.

The "MACERITE" is prepared by using a metal alkoxide as a starting material and depositing a fluorine phlogopite crystal into a glass-like matrix according to the sol-gel process.

Then, gold is vapor deposited on the reflective surface 2 of the diffusion reflector 1 obtain the diffusion reflector 1 according to the present embodiment.

Figure 1:
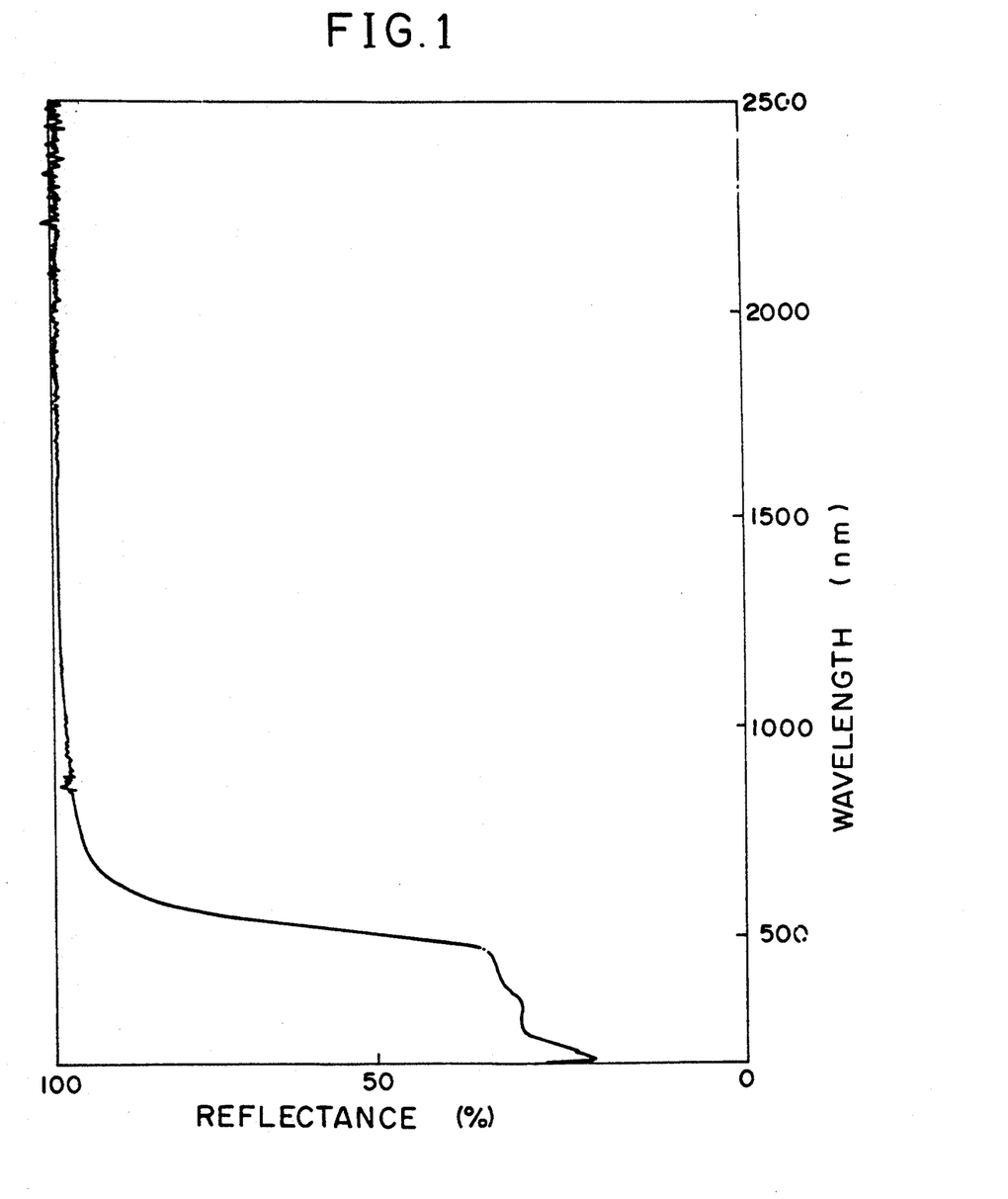
FIG. 1 a graphic representation showing the experimental results according to an embodiment of the present invention.

The aforementioned experiment shown in FIG. 3 was carried out using the diffusion reflector 1, and the result shown in FIG. 1 was obtained.

That is, in the present embodiment, the reflective characteristic of gold is reflected in the diffusion reflector 1, and a high reflectance near 100% is indicated in the wavelength region.

Also in the case where silver is vapor deposited on the inner surface of the reflective cylinder 1, the effect similar to that of the case in which gold is vapor deposited can be expected.

That is, in the present embodiment, by the vapor deposition of gold, ultraviolet region light having a short wavelength (less than 500 nm) can be interrupted without deteriorating the diffusion reflective characteristic.

REFERENCE EXAMPLE

Figure 2:
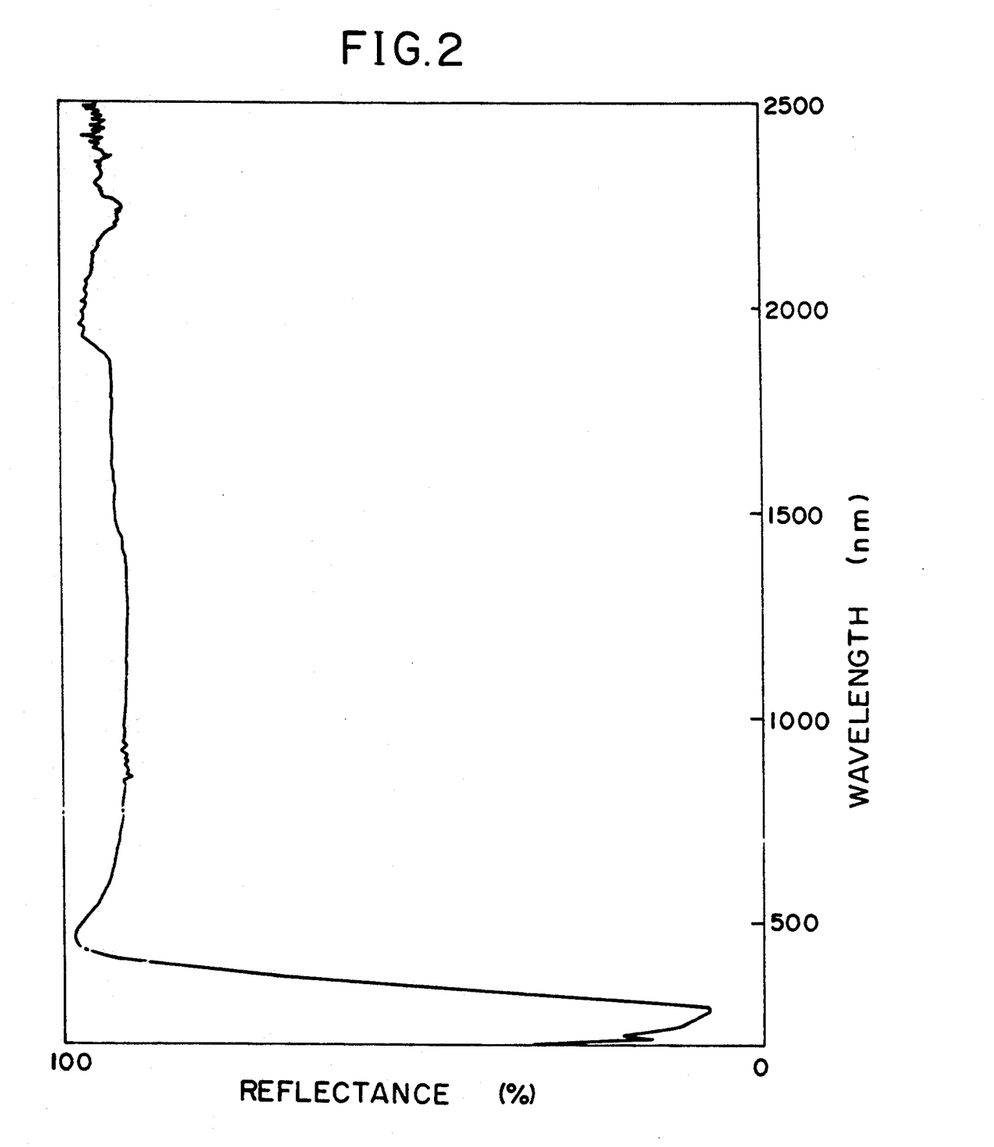
FIG. 2 is a graphic representation showing the results of a comparative example.

As a reference example, a transparent coating in place of gold is coated on the reflective surface 2 of the diffusion reflector 1. The result of measurement shown in FIG. 2 was obtained. It is understood from this figure, the reflectance is 96% at maximum over the region from infrared to near infrared region.

Comparison between embodiment and reference example

It is understood that the aforesaid embodiment provides the reflective characteristic peculiar to metal as compared with the reference example and the improved diffusion reflectance.

APPLIED EXAMPLE

An example in which the diffusion reflector of the aforementioned embodiment is applied to a solid laser device will be described hereinafter.

Figure 4:
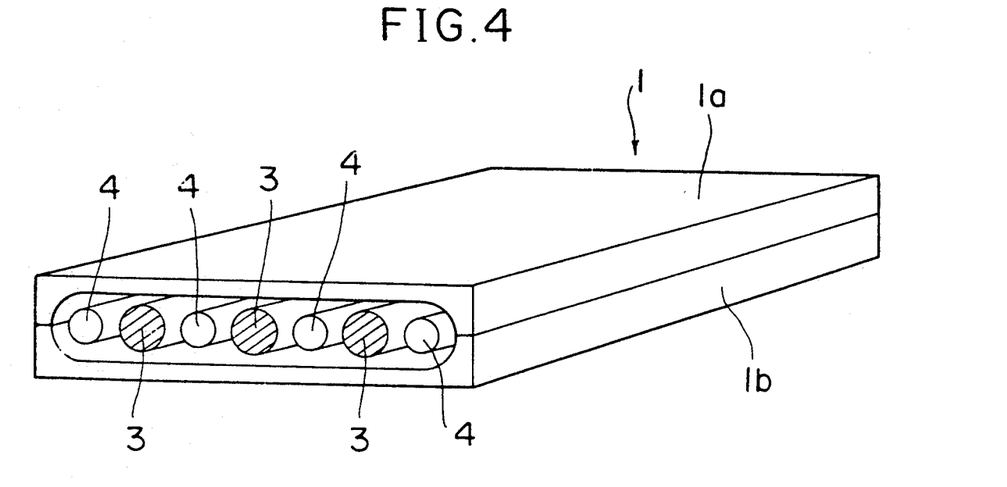
FIGS. 4 to 6 are respectively views showing applied examples, FIG. 4 being a perspective view, FIG. 5 being a cross-sectional view, and FIG. 6 being a longitudinal sectional view.
Figure 5:
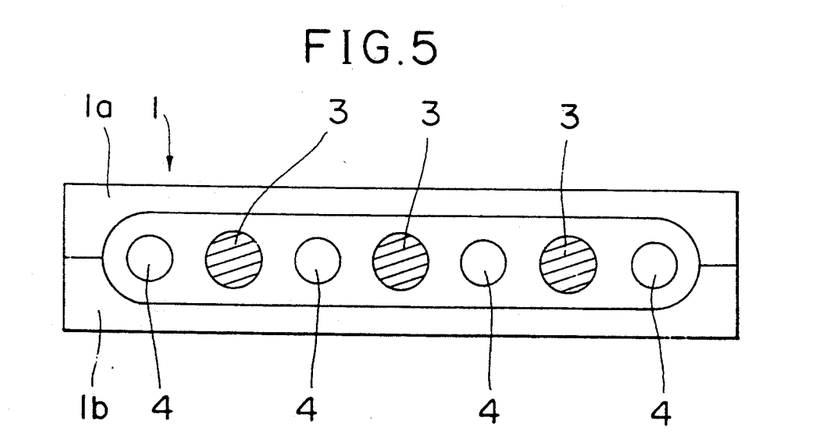

As shown in FIGS. 4 and 5, a reflective cylinder 1 formed from the aforementioned diffusion reflector comprises plate-like blocks 1a and 1b placed one upon the other and has an internal section forming into a shape in which a circle having a radius of 14 mm is divided into two parts between which are connected by a straight line of 120 mm.

Four lamps 4 and three laser rods 3 arranged between the lamps 4 are arranged within the reflective cylinder 1. These lamps 4 and laser rods 3 are arranged in parallel so that axial directions thereof are parallel with each other.

A clearance between the inner surface of the reflective cylinder 1 and the laser rod 3 is suitably from 5 mm to 15 mm, preferably, about 10 mm.

Figure 6:
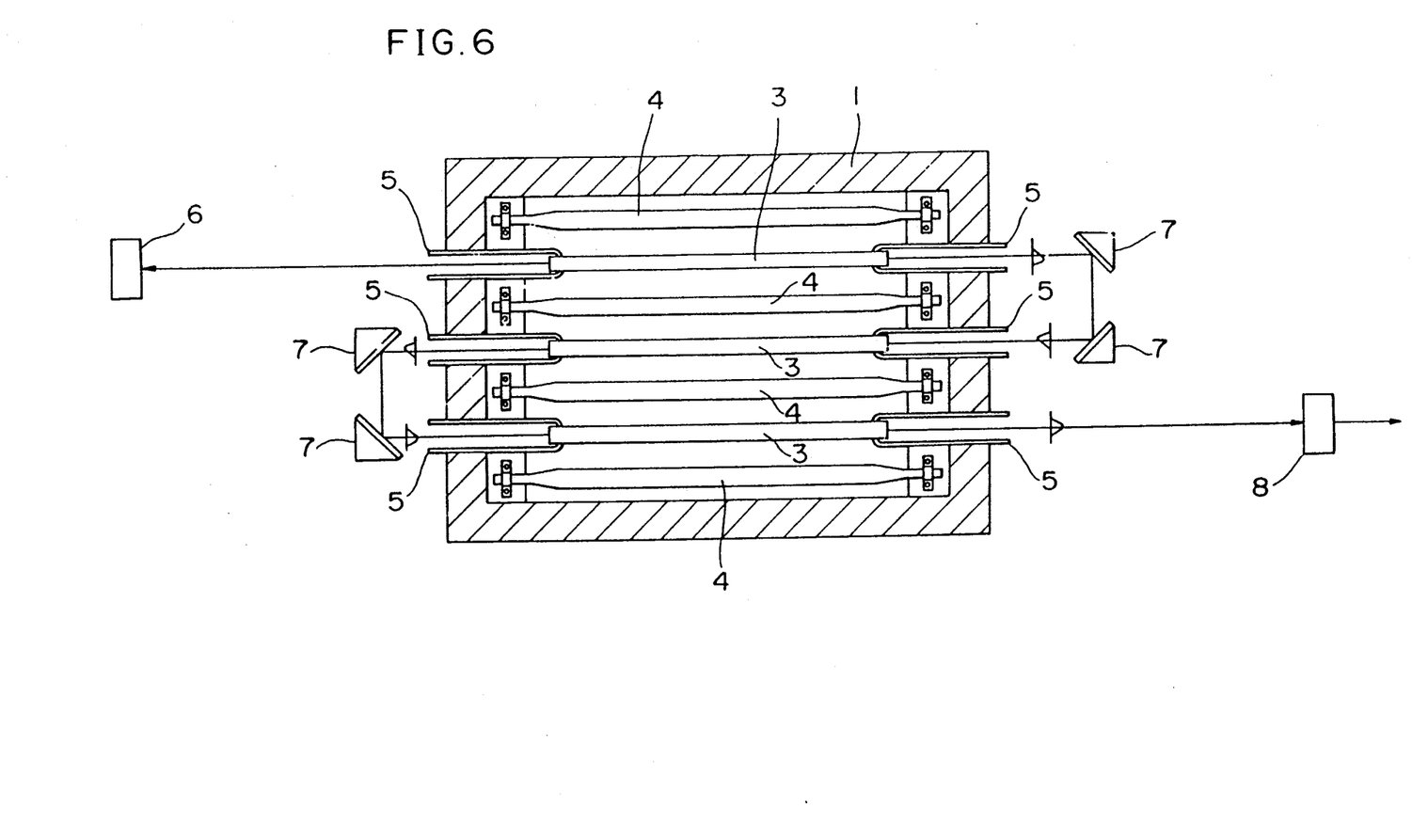

As shown in FIG. 6, three laser rods 3 are each in the form of a tubular support 5, which is supported on both ends of the reflective cylinder 1. An omnireflective mirror 6 is arranged on an axial outward extension of one end of the first laser rod 3 from the top of FIG. 6.

Connection mirrors 7 for reflecting incident light at an angle of 90° are arranged on the other end side of the first laser rod 3, both end sides of the second laser rod 3, and one end side of the third laser rod 3, respectively, the laser rods 3 being optically connected in series. An output mirror 8 is arranged on the other end (output end) of the third laser rod 3.

When the lamps 4 are continuously or pulse-wise illuminated, excited light from the lamps 4 are diffused and reflected in the inner surface of the reflective cylinder 1 and condensed on the laser rods 3. The laser rods 3 generate laser oscillations by means of said condensed light, and laser beams are generated from the both ends thereof.

The generated beam is sequentially reflected between the omnireflective mirror 6, the connection mirror 7 and the output mirror 8 and amplified in three stages to increase the output.

According to the aforementioned applied example, the reflective cylinder 1 is formed from the diffusion reflector of the present invention. The internal section of the reflective cylinder 1 has a shape in which two semicircles are connected by a straight line, within which said laser rods 3 and lamps 4 are provided. Therefore, light can be diffused without focussing, and the laser rods 3 can be uniformly excited to obtain a high efficiency.

Furthermore, the inner section of the reflective cylinder 1 can be made into a simple shape, and therefore, the manufacture thereof is easy. Particularly, if a free-cutting mica ceramics is used, precise machining of a shape can be easily accomplished.

Particularly, even single laser rod, though not shown, can provide a sufficient effect, in the aforementioned applied example.

What is claimed is:

1. A diffusion reflector having a diffusion reflective surface characterized in that at least one metal selected from the group consisting of gold and silver is vapor deposited on said diffusion reflective surface.

2. A diffusion reflector according to claim 1, wherein said reflector is formed of a material whose diffusion reflectance is substantially 95% or more.

3. A diffusion reflector according to claim 1 or 2, wherein said reflector is formed of mica ceramics or fluorine plastics containing barium sulfate.

4. A solid laser device in which one or more laser rods and lamps are provided internally of a space within a reflective cylinder, and light released from said lamps is reflected by an inner surface of said reflective cylinder to irradiate said light against said laser rods, said reflective cylinder being formed from a diffusion reflector, said diffusion reflector being formed of mica ceramics or fluorine plastics, said diffusion reflector having a space section which has a shape in which two semicircles are connected by a straight line, said inner surface of said diffusion reflector having at least one of gold and silver vapor-deposited thereon, said one or more laser rods and lamps being arranged in parallel interiorly of said reflective cylinder.

* * * * *